Feb. 7, 1950     J. R. BENNETT     2,496,770
FLEXIBLE MOUNTING
Filed Sept. 4, 1945     2 Sheets-Sheet 1
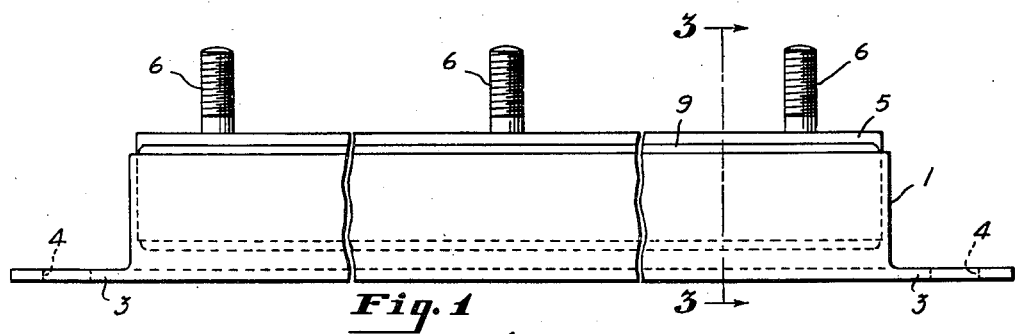
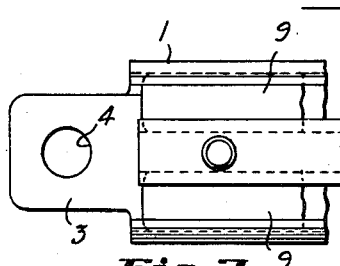
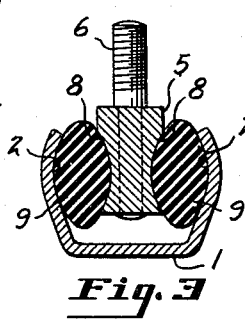
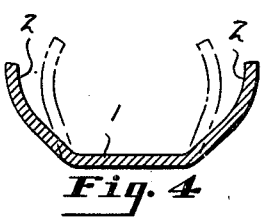
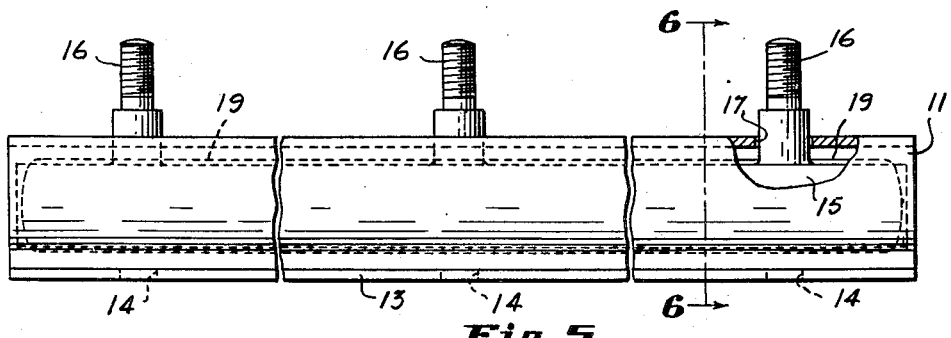
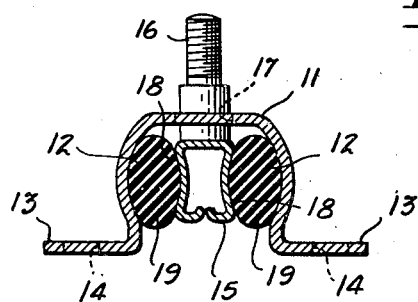
INVENTOR.
John R. Bennett
BY
Evans + McCoy
ATTORNEYS Feb. 7, 1950 J. R. BENNETT 2,496,770
FLEXIBLE MOUNTING
Filed Sept. 4, 1945 2 Sheets-Sheet 2

INVENTOR.
John R. Bennett
BY
Evans + McCoy
ATTORNEYS

Patented Feb. 7, 1950

2,496,770

UNITED STATES PATENT OFFICE 2,496,770

FLEXIBLE MOUNTING

John R. Bennett, Wabash, Ind., assignor to The General Tire & Rubber Company, Akron, Ohio, a corporation of Ohio Application September 4, 1945, Serial No. 614,162

6 Claims. (Cl. 248—358)

This invention relates to flexible mountings for machines, instruments and the like, the mountings being of the type employing elastic rubber cushions for absorbing shocks and damping vibrations.

This invention has for its object to provide a shock absorbing, vibration damping mounting suitable for use where the supporting elements are required to be mounted in elongated spaces limited in width and height.

With the above and other objects in view the invention may be said to comprise the mounting as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of a mounting embodying the invention;

Fig. 2 is a fragmentary top plan view of one end of the mounting;

Fig. 3 is a section taken on the line indicated at 3—3 in Fig. 1;

Fig. 4 is a transverse section showing in full lines the shape which the channel shaped supporting member may have prior to assembly, the dotted lines showing the flanges bent up against the rubber cushioning elements as in Fig. 3;

Fig. 5 is a side elevation showing a modified form of mounting embodying the invention;

Fig. 6 is a section taken on the line indicated at 6—6 in Fig. 5;

In Figs. 1 to 4 of the drawings, a mounting is shown which has a channel shaped metal supporting member 1 that has side flanges provided with inner transversely concave faces 2. The supporting member 1 is adapted to be supported with its base resting upon a suitable support to which it may be attached by suitable means such as the extensions 3 having bolt holes 4 to receive attaching bolts.

Figure 11:
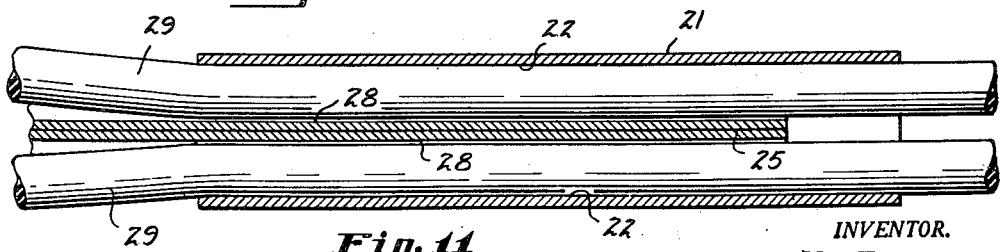
Fig. 11 is a view illustrating a method of assembling the mounting of the present invention.

Mounted within the channel 1 there is an elongated load supporting bar 5 that carries vertically disposed attaching bolts 6 to which the structure to be supported may be attached. The bar 5 has transversely concave side faces 8 which are disposed opposite the inner concave faces 2 of the supporting member and elongated cushioning members 9 are interposed between the load supporting bar 5 and the concave faces 2 of the channel supporting member. The rubber members 9 are preferably held under compression between the flanges of the channel member and the load carrying bar and these rubber members may be assembled with the channel supporting member and load supporting bar by placing the rubber members 9 within the channel 1 and reducing their cross section by stretching the rubber members, as shown in Fig. 11, after which the bar 5 is inserted endwise into the space between the rubber members and the tension on the members 9 is released, allowing the members to contract in length and expand in cross section to fill the space between the supporting bar 5 and the flanges of the supporting member, so that the rubber cushioning members are held under compression between the load supporting bar and the flanges of the channel shaped supporting members.

Another way of assembling this mounting member is to form the channel 1 with the flanges thereof spread apart a greater distance than in the finished mounting, placing the load carrying bar and cushioning members 9 within the spread flanges and then applying pressure to the flanges to bend them toward each other and to clamp the rubber cushioning members and load carrying bar between them.

In Figs. 5 and 6 of the drawings a mounting is shown which employs a channel shaped supporting member 11 that has side walls provided with transversely concave inner faces 12 similar to the concave faces 2 in the modification first described. The channel member 11 is mounted on a suitable support with its channel opening downwardly and the side flanges of the channel have laterally bent attaching portions 13 provided with bolt holes 14 to receive attaching bolts to secure the member to a fixed support. Mounted within the channel member 11 is a load carrying bar 15 which may be of tubular form and which carries a plurality of vertically disposed attaching bolts 16 that project upwardly through bolts 17 in the top wall of the supporting member 11. Elongated elastic rubber cushioning members 19 are positioned between the load carrying bar 15 and the inner concave faces 12 of the supporting member and these cushioning members are held under compression between the load carrying bar and the supporting member.

The mounting shown in Figs. 5 and 6 may be assembled by placing the elastic cushioning members 19 within the channel, stretching these members to reduce the cross section thereof, and forcing the load carrying bar 15 through the open side of the channel member into the space between the cushioning members, after which the cushioning members are released and allowed to contract longitudinally and expand laterally in the spaces between the load supporting bar and the supporting member.

Figure 7:
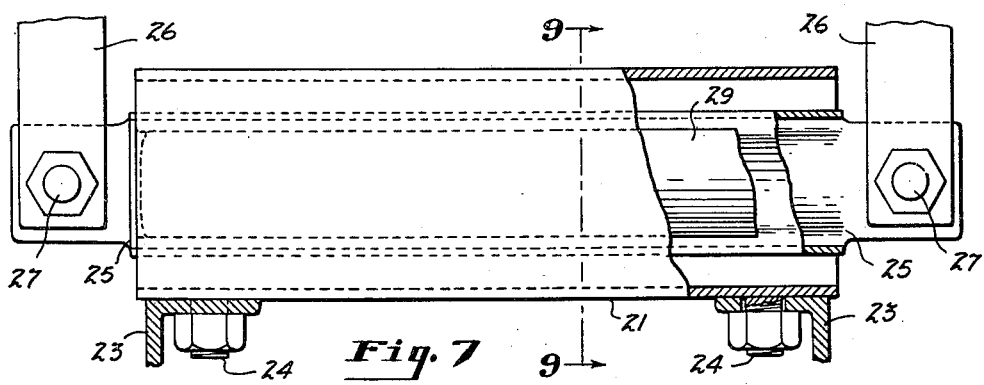
Fig. 7 is a side elevation of another form of mounting embodying the invention, an end portion of the mounting being broken away and shown in longitudinal vertical section.
Figure 8:
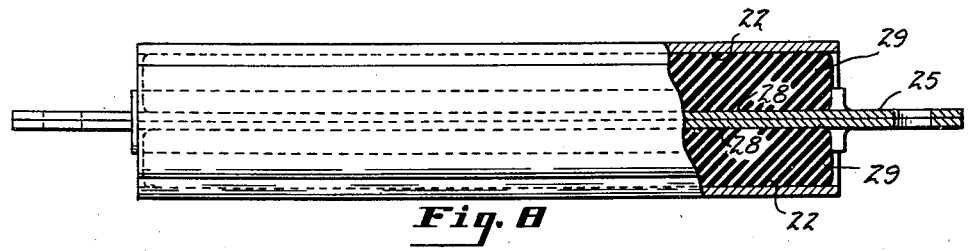
Fig. 8 is a top plan view of the mounting shown in Fig. 7, one end portion being broken away and shown in longitudinal horizontal section.
Figures 9, 10:
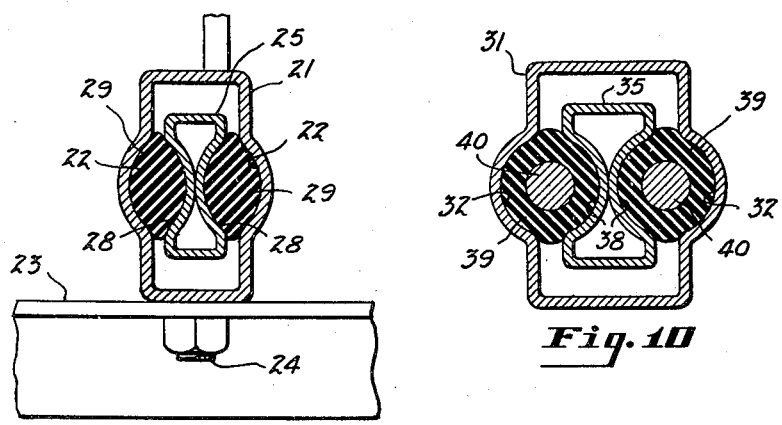
Fig. 9 is a section taken on the line indicated at 9—9 in Fig. 7.
Fig. 10 is a sectional view showing a slightly modified construction.

In Figs. 7, 8 and 9 of the drawings another mounting embodying the invention is shown. In this modification a supporting member 21 is provided which is in the form of an elongated substantially rectangular tubular member which has substantially parallel side walls formed to provide longitudinal internal grooves therein. The supporting member 21 may be attached to a rigid support 23 by suitable means such as bolts 24. An elongated load carrying bar 25 of greater length than the supporting member 21 extends longitudinally through the tubular supporting member and has opposite end portions projecting past opposite ends of the member 21. Suitable vertically disposed load carrying members 26 are attached to projecting ends of the bar 25 by suitable means such as bolts 27. The bar 25 may be of tubular form and is provided on opposite sides thereof with longitudinal grooves 28 which are adapted to aline with grooves 22 formed in the side walls of the member 21. Elongated rubber cushioning members 29 are mounted between opposite sides of the load carrying bar 25 and the side walls of the supporting member 21 and are seated in the grooves 22 and 28 of the supporting member and bar. The mounting is assembled by first inserting the rubber cushioning members 29 through the supporting members 21 and applying tension to the ends of the elastic rubber cushioning members to stretch the same and reduce their cross sectional dimensions. With the members 29 stretched the load carrying bar 25 may be inserted endwise through the tubular supporting member 21 until it is properly positioned with respect to the supporting member, after which the rubber members 29 may be released and allowed to contract into the spaces between the load carrying bar 25 and the side walls of the supporting members 21, the members 29 expanding laterally when released to fill the seating grooves 22 and 28.

In Fig. 10 a slightly modified construction is shown in which a tubular supporting member 31 is provided which has parallel side walls with longitudinal grooves 32. A load supporting bar 35 is mounted within the supporting member 31 and has longitudinal grooves 38 that face the grooves 32 of the supporting member. The structure shown in Fig. 10 is very similar to that shown in Figs. 5 to 9 except that a different form of cushioning element is employed. The cushioning element in this instance consists of a tubular rubber sheath 39 surrounding a non-elastic core 40. The tubular rubber sheath may be stretched to reduce the cross sectional area thereof sufficient to permit insertion of the load carrying bar 35 and upon release of the tubular rubber sheath the cushioning elements will be tightly compressed in the spaces between opposite sides of the load carrying bar and the supporting member. By providing an inelastic core, a stiffer support is provided, capable of providing a yielding support for a heavier load than could be supported upon an all rubber cushion of the same size.

In any of the modifications disclosed the cushioning members may be secured to the seats on the load carrying bar and supporting members by a suitable rubber-to-metal adhesive which may be applied to the rubber members prior to assembly.

It is to be understood that variations and modifications of the specific devices herein shown and described for purposes of illustration, may be made without departing from the spirit of the invention.

What I claim is:

1. A flexible mounting comprising an elongated bar having opposite side faces recessed from end to end, an elongated member having walls between which said bar is received which have inner faces with longitudinal recesses opposed to the recessed faces of said bar, and elongated elastic rubber members under compression between said opposed recessed faces, said rubber members being retained by said recesses and forming resilient supports for said bar.

2. A flexible mounting comprising an elongated bar having means for attachment to a member to be supported, said bar having opposite side faces that are transversely concave, an elongated supporting member having walls between which said bar is received, said walls having internal transversely concave faces opposed to the concave faces of said bar, and elongated elastic rubber members under compression between the opposed concave faces, said rubber members being retained by said recesses and resiliently supporting said bar.

3. A flexible mounting comprising an elongated bar having means for attachment to a member to be supported, said bar having opposite side faces that are transversely concave, an elongated channel shaped supporting member having a web and curved side walls providing transversely concave inner faces opposed to the concave side faces of the bar, and elongated elastic rubber members under compression between each side face of said bar and a side wall of the supporting member, said rubber members being held in place between the said side walls and bar by engagement with the opposed concave faces of the side walls and bar and supporting said bar out of contact with said web and side walls.

4. A flexible mounting comprising an elongated bar having means for attachment to a member to be supported, said bar having opposite side faces that are transversely concave, an elongated supporting member having walls between which said bar is received, said walls having internal transversely concave faces opposed to the concave faces of said bar, and cushioning members interposed between the concave faces of the bar and supporting member, each comprising an elastic rubber tube upon a non-elastic core.

5. A flexible support comprising an elongated load carrying bar having transversely concave side faces, a tubular supporting member having walls with transversely concave inner faces opposed to the side faces of said bar, and elongated elastic rubber cushioning members under compression between the opposed concave faces of the bar and supporting member.

6. A flexible support comprising an elongated tubular member having substantially parallel side walls, each of which has a longitudinal internal groove, a load carrying bar longer than said supporting member and extending through said supporting member with its ends projecting past the ends of the supporting member, said bar having sides facing said side walls of the tubular supporting member and provided with longitudinal grooves facing the grooves of the side wall and elongated rubber cushioning members under compression between the bar and tubular member and positioned in the grooves of the bar and tubular member.

JOHN R. BENNETT.

REFERENCES CITED

The following references are of record in the file of this patent:

UNITED STATES PATENTS

| Number | Name | Date |
|---|---|---|
| 2,115,713 | Haire | May 3, 1938 |

FOREIGN PATENTS

| Number | Country | Date |
|---|---|---|
| 382,017 | Great Britain | Oct. 20, 1932 |
| 384,222 | Great Britain | Dec. 1, 1932 |
| 407,788 | Great Britain | Mar. 29, 1934 |
| 466,354 | Great Britain | May 26, 1937 |